Aug. 23, 1932.  E. R. LEDERER  1,872,988
PROCESS FOR REACTIVATING CLAY
Filed May 31, 1930  2 Sheets-Sheet 2

INVENTOR
ERWIN R. LEDERER
BY
ATTORNEYS

Patented Aug. 23, 1932

1,872,988

UNITED STATES PATENT OFFICE

ERWIN R. LEDERER, OF FORT WORTH, TEXAS

PROCESS FOR REACTIVATING CLAY

Application filed May 31, 1930. Serial No. 457,688.

This invention relates to the recovery and reactivation of finely ground clay used in the decolorizing filtration or purification of hydrocarbon oils.

It is the object of my invention to provide a method of and apparatus for treating and reclaiming the decolorizing clay used in contact filtration of lubricating or other oils, to bring about a substantial economy in the use of the clays by permitting repeated re-use thereof.

Another object of my invention is to provide a method and apparatus for the treatment and reconditioning of decolorizing clays whereby the efficiency of the original clay is not materially reduced by repeated reconditioning treatments.

Another object of my invention is to provide an apparatus and process for the treatment of finely ground clay used in contact filtration whereby the clay may be reconditioned for re-use from ten to twenty times before losing materially in its decolorizing efficiency and whereby a greater percentage of the lubricating stock remaining in the clay filter cake may be saved than is normally possible.

Further objects and advantages of my invention will appear from the following description of preferred forms of embodiment thereof in conjunction with the attached drawings which schematically illustrate the process, in which.

In the treatment of lubricating oil stocks to remove decolorizing impurities, wax and other solids therefrom it has become customary to subject the oil which may or may not have been previously treated with sulfuric or other acid to the action of a decolorizing and bleaching clay such as montmorillonites, bentonites, etc., by intimately mixing the finely ground clay with the oil and then passing the mixture through a filter to separate the clay and sludge from the oil. Decolorizing and filtering clays of the type commonly used are fairly expensive and are often subjected to special acid and washing treatments to remove impurities therefrom before they can be used with the oil, which further increases their cost and prior to the present invention have usually been discarded, after being used only once, because no satisfactory method has existed for recovering and reactivating the used clays without destroying their decolorizing or filtering value.

According to my invention it is possible to recover and restore the used clays to substantially 80% to 90% of the decolorizing value of the original clay and to repeat the restoration steps ten to twenty times before the efficiency of the clay falls so low as to make further revivication unprofitable.

The revivified clay does not need further acid treatment and can be re-used for decolorizing oil substantially as well as new clay.

Previous attempts to recover and reactivate filtering and bleaching clays used in contact filtration have been unsuccessful largely because of the failure to thoroughly remove the oil or naphtha from the clay previous to the burning of the clay so that the oil or naphtha became ignited and burned in the clay thus locally raising its temperature above the point of reactivation and destroying the value of the clay through overburning.

It is the keynote of my present process that the hydrocarbons, oil and naphtha are preliminarily removed so as to prevent any combustion in the clay when it is subjected to a higher reactivating temperature and that the higher reactivating temperature is carefully controlled to prevent overburning of the clay.

In my present process, I also recover a large percentage of the oil which is normally retained in previously discarded clays and also recover the naphtha and substantially all of the clay which can then be economically reprocessed and reintroduced into the system.

Figure 1:
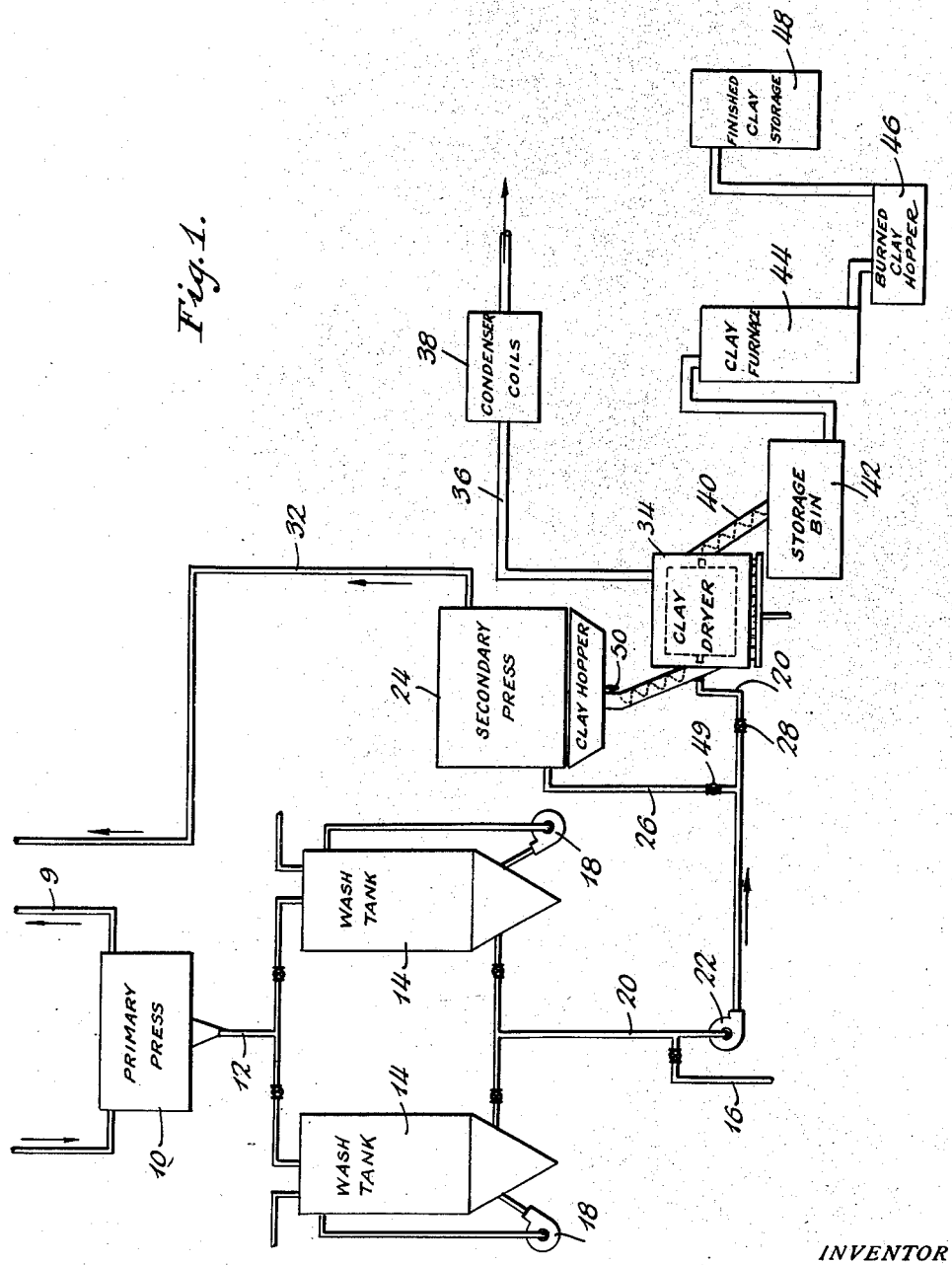
Figure 1 is a schematic layout of one form of process and treatment apparatus for the treatment of the clay.

In the practice of my invention, the filter cake consisting of clay, sludge, and retained oil, is removed from the primary filter press 10 shown in Figure 1, in which the oil which passes out through the conduit 9 is separated from the clay used in the decolorizing treatment. The filter cake which is contaminated with oil, sludge and impurities, is conducted by means of the conduit 12 to the wash tanks 14 which may preferably be used in pairs and a suitable supply of naphtha is introduced into the wash tanks 14 by the conduit 16 and circulated with the clay by the pumps 18 to thoroughly leach out the oil contained in the cake. The mixture of oil, naphtha, and clay is then drawn from the wash tanks 14 through the conduit 20 by the circulating pump 22 which normally directs the mixture into the secondary filter press 24 by the conduit 26, the valve 28 in the conduit 20 being normally closed. The filter cake from the first filter which has been suitably leached with naphtha to remove the entrapped oil is again pressed in the secondary filter 24 which may be of the continuous pressure type. To avoid the loss of volatile fluids and reduce the fire hazard the oil and naphtha filtrate from this second filter 24 is removed through the conduit 32 and distilled in a suitable still to separate and recover the naphtha and oil.

The clay after leaving the secondary press 24 as filter cake, still contains a large amount of naphtha which would become ignited and cause irregular burning and destruction of the activity of the clay if subjected directly to a high heat. The clay is, therefore, first subjected to a mild heat in the clay drier 34 upon removal from the clay hopper of the secondary press 24. The clay drier 34 is preferably a cylindrical rotating drum tightly enclosed in the casing 34 and equipped with revolving arms scraping the sides of the cylindrical vessel and adapted to move the clay from the entrance to the outlet at a predetermined speed. The entrance and outlet of the drier 34 are properly sealed to prevent ignition of the naphtha vapors and the heat is regulated to drive off the naphtha without igniting the same. The drier may be heated by any suitable means as by gas or fuel oil or flue gases or superheated stem. The heat of the drier 34 preferably should not exceed 450 to 500 degrees F. which is sufficient to drive off the naphtha contained in the clay in a reasonably short time without igniting the naphtha vapors.

A vapor outlet 36 is provided on the drier to conduct the naphtha vapors to a condenser 38 where they are collected and made ready for use again as solution naphtha.

A dust collector or screen may be provided at the outlet of the vapor conduit 36 to catch any fine particles of clay which might be mechanically carried off with the vapors and the drier is also properly sealed at the inlet to prevent loss of fine clay.

The dried clay which contains no naphtha and very little moisture, oil and impurities, is then discharged through the conduit 40 into the storage bin 42 from which the clay is then conveyed into the clay furnace 44 for further burning which is carried on at a temperature which may vary from 750 to 1200 degrees F. but preferably does not exceed 875 to 900 degrees F. as temperatures in excess of this may bring about a structural change in the clay which destroys its absorbing and decolorizing properties and makes it unsuitable for further use. It is desirable that a regular feed be maintained in proportion to the size of the furnace and the number of hearths in order to uniformly reactivate the clay and steam may be injected during this operation to produce slow regular burning of the clay. It is thus obvious that the small percentage of moisture which remains in the cake from the clay drier is not an impediment.

The burned clay from the furnace 44 is dropped to the hopper 46 and finally stored in the finished clay storage tank 48 ready for re-use. This restored clay has about 80% to 90% of the efficiency of new clay and it is not necessary in re-using it to again treat it with sulphuric acid. It can be used either as a dry clay or pulped with water, thus saving the expense of the original acid treatment and pulping process. The restoration treatment may be repeated sometimes as high as twenty-two times before the efficiency of the clay drops gradually to 50 percent of the original.

By the present process, it is not only possible to recover substantially all of the naphtha used in the leaching step, but also to recover a very large portion of the lubricating stock which was contained in the naphtha wash and in the clay.

The preliminary separation of the naphtha from the clay in the drier 34 is a highly important step in the process as it not only permits recovery of the naphtha but prevents overheating and destruction of the clay in the further burning step.

Revivication of the clays necessitates burning or calcining of the clay at a temperature of 875° to 900° F. but higher temperatures may cause overburning and destruction of the decolorizing value. Previous attempts to reactivate bleaching clays, have neglected to remove the naphtha and oil from the clays with the result that when subjected to higher temperatures the naphtha and oil in the clay caught fire and raised the calcining temperature and substantially destroyed the decolorizing value of the clay.

It is possible to construct a clay drier 34 which will remove a higher naphtha content (from seventy to eighty percent) from the filter cake after it has been in the wash tanks 14 and it may therefore be unnecessary to use the secondary filter 24. If it is found that it is unnecessary because of the nature of the washing treatment to use the secondary filter, it is only necessary to close the valve 49 in the conduit 26 and the valve 50 below the clay hopper and open the valve 28 in the conduit 20 and the leached clay containing the high percentage of naphtha can be sent to the drier directly. The heat in the drier will thus cause a volatilization of the naphtha which will be condensed and recovered in the condenser coils 38 and the dried clay passed on directly to the clay furnace 44 through the storage bin 42. The secondary press is usually desirable but is not absolutely essential and in some cases the economy of the process and the rapidity with which the clay is to be treated may make it desirable to temporarily close off the secondary press.

Figure 2:
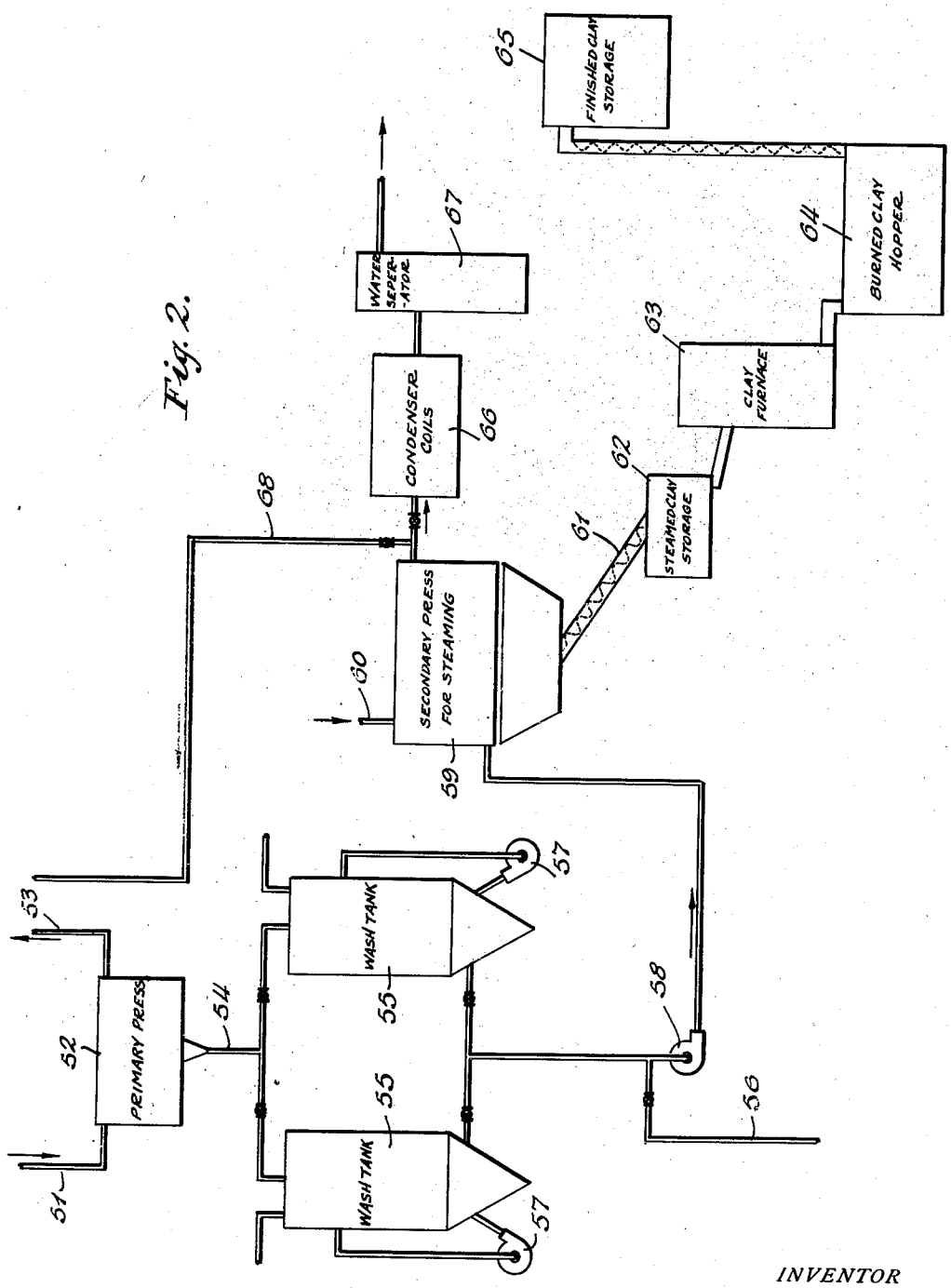
Figure 2 is a view similar to Figure 1 but of a modified form of apparatus.

A slightly modified form of the process for the treatment of lubricating oil which has been heretofore acid treated is shown in Figure 2. Such oil which usually contains traces of free acid and sludge from such previous treatment cannot be steamed in the primary filter press due to corrosive and destructive action by weak acids produced by condensation of steam and the acid contained in the oil.

In this form of the apparatus the oil passes through the oil inlet 51 into the primary press 52 and the filtrate which is suitably treated and clarified lubricating oil stock passes out of the filter through the outlet 53. As in the previous apparatus the filter cake which is the clay to be treated passes through the conduit 54 into the wash tanks 55 and the naphtha for leaching enters through the pipe 56. The circulating pumps 57 recirculate the mixture throughout the wash tanks and finally discharge by the aid of the circulating pump 58 directly into the secondary press 59. Steam enters the secondary press through the conduit 60 and it may be possible to eliminate sufficient wash naphtha in this secondary press by steaming so that the clay will become dry enough to drop from the filter surface and not contain enough naphtha to cause irregular burning in the recovery furnace. When this occurs, the dried filter cake drops into the conveyor 61 and is conveyed into a steamed clay storage tank 62 from which it passes through the clay furnace 63 which is maintained at substantially the same temperature as the clay furnace 44 and sufficient to reactivate the clay for further use. The reactivated clay then drops to the burned clay hopper 64 and is finally stored in the storage tank 65.

Due to the steaming in the secondary press, a high percentage of naphtha is driven off into the condenser 66 and the water is separated from the naphtha in the water separator 67. After being condensed, the naphtha may be drained off to a suitable reservoir not shown, as suitable naphtha for re-use in washing or it may be re-used in any other manner. Under certain conditions the clay and oil mixture which is introduced through the conduit 51 to the primary press 52 could be filtered and washed in the press itself rather than in separate wash tanks as heretofore discussed. The contact filtering of the clay oil mixture would be carried out as in normal operation and when the point is reached that it is no longer economical to continue the filtering cycle, the press may be washed with warm naphtha introduced through the conduit 56 at a temperature of 120° to 150° F. This washing is continued until the filtrate has reached a uniform color. A special narrow cut naphtha of high initial boiling point is necessary for this washing operation and it requires from five to twelve minutes. This reduces the oil content of the cake to below 2% and the cake now contains less than 2% oil and from 35% to 40% naphtha.

Open steam is then introduced into the press and is allowed to steam into a suitable condenser which condenses the naphtha which is driven from the cake. The steaming operation is continued until no naphtha can be detected in the steam. This requires from five to fifteen minutes and the cake then contains less than 1% oil and 1% naphtha. Such a small amount of naphtha is unobjectionable in the revivifying process and will not cause irregular burning.

The cake is then dropped from the leaves of the press by means of steam jets placed at convenient locations inside of the press so that the entire surface of the leaf will be sprayed with high pressure steam. This thoroughly cleans the leaf and prevents plugging of the screen. The clay is then directly conveyed into the closed storage bins 62 where it is stored preparatory to burning in the special furnaces.

In such a process, it is not necessary to use the wash tanks as the filtering and washing may be done directly on the filter and in the filter casing. It is also unnecessary to use the secondary press or the drier as the special solution naphtha is sufficient to reduce the oil content and the steaming in the filter will drive off the undesirable high naphtha content.

It will thus be obvious that this process permits the use of any filter and washing may be carried out in a mixing tank after being discharged from the filter so that continuous filters may be used or washing of certain oils may be carried out in the filter press itself. It is possible to steam the clays that have a tendency to sludge by using a filter surface made of a compressed material such as cotton fiber or asbestos. It is also possible to recover a large percentage of the excessive fine material which runs through the filters in successive use and harms the pour test and emulsion test of the finished oil as well as machinery through which the oil comes in contact in successive operations. This is particularly possible when the washing is not carried on in the primary filter but in a separate wash tank, and after the washing and repulping, the cake is again filtered.

While I have described my process and shown preferred forms of embodiment thereof in connection principally with decolorizing clays, I am aware that other filter clays and modifications may be used and I therefore desire a broad interpretation of my invention within the scope and spirit of the disclosure and of the claims appended hereinafter.

I claim:

1. The method of recovering and reactivating bleaching clays having absorbed hydrocarbon oil and diluents therein, which comprises the steps of removing the clay from the primary filter, leaching the clay with a low boiling point hydrocarbon in separate wash tanks to recover the entrapped oil therefrom, refiltering the clay pulp to remove the leached oil and the low boiling point hydrocarbon, preliminarily drying the clay at a temperature below the ignition point of the low boiling point hydrocarbon to remove the low boiling point hydrocarbon without igniting the same, and finally subjecting the clay to a heat sufficient to revive the clay and higher than the flash point of the low boiling point hydrocarbon.

2. The process of recovering and reactivating bleaching clays for oil filtration which comprises removing the clay from the primary filter, washing and leaching the cake from the primary filter with naphtha to recover the entrapped oil therefrom, refiltering the wash clay in the second filter, drying the clay in a drier maintained at a temperature between the volatilization point and the ignition point of the naphtha and the subsequent burning of the clay at a temperature not less than the temperature in the first furnace and not more than necessary to reactivate the clay without destroying its decolorizing value.

3. The process according to claim 2 in which air is excluded from said first drier.

4. The method of recovering and reactivating bleaching clays for use in the contact filtration of oils which comprises removing the clay from the primary filter press, washing the used clay with naphtha to free it from oil, removing the naphtha from the washed clay, preliminarily heating the washed clay at a temperature below 500° F. to drive off the naphtha without igniting the naphtha vapors, and subsequently burning the clay to at approximately 800 to 900° F. to remove organic materials and restore its bleaching activity.

5. The method of reactivating bleaching clay used in oil filtration which comprises removing the clay filter cake from the primary filter press, washing said clay to remove the entrapped oil therefrom, filtering the washed clay in a secondary filter press to separate the clay from the washing liquid, preliminarily drying the clay to remove the washing liquid therefrom without igniting said washing liquid, and subsequently burning said clay at a heat sufficient to revivify the same.

In testimony whereof I have affixed my signature to this specification.

ERWIN R. LEDERER.